(12) United States Patent
Furusawa et al.

(10) Patent No.: US 9,943,940 B2
(45) Date of Patent: Apr. 17, 2018

(54) POWER TOOL (71) Applicant: MAKITA CORPORATION, Anjo-shi, Aichi (JP)

(72) Inventors: Masanori Furusawa, Anjo (JP); Hideki Tsuji, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 15/285,079

(22) Filed: Oct. 4, 2016

(65) Prior Publication Data
US 2017/0100809 A1 Apr. 13, 2017

(30) Foreign Application Priority Data

Oct. 7, 2015 (JP) .................................. 2015-199448

(51) Int. Cl.
B23B 47/34 (2006.01)
B25D 17/18 (2006.01)
B23Q 11/00 (2006.01)
B23B 45/00 (2006.01)

(52) U.S. Cl.
CPC ........ B23Q 11/0071 (2013.01); B23B 45/003 (2013.01); B23Q 11/0046 (2013.01); B23B 2270/30 (2013.01); B23B 2270/62 (2013.01); Y10T 408/50 (2015.01)

(58) Field of Classification Search
CPC . B08B 15/04; B23Q 11/0071; B23Q 11/1146; B23B 47/34; B23B 2270/30; B23B 2270/62; Y10T 408/50
See application file for complete search history.

(56) References Cited

U.S. PATENT DOCUMENTS

| 5,467,835 A * | 11/1995 | Obermeier | B23Q 11/0046 173/75 |
| 6,851,898 B2 * | 2/2005 | Ege | B23Q 11/0046 408/241 S |
| 7,354,226 B2 * | 4/2008 | Britz | B23Q 11/0046 144/252.1 |

(Continued)

FOREIGN PATENT DOCUMENTS

| DE | 102013212022 A1 * | 1/2015 | ............. B25D 17/20 |
| DE | 202017100783 U1 * | 2/2017 | ................ B25F 5/00 |

(Continued)

*Primary Examiner* — Daniel Howell
(74) *Attorney, Agent, or Firm* — Oliff PLC (57) ABSTRACT

A power tool includes a drilling tool and a dust collector configured to be removably attached to the drilling tool. The dust collector includes a dust collector body, a passage part provided in the dust collector body and having elasticity, and a storing part configured to be removably attached to the dust collector body and to store dust. The passage part includes a drilling tool mounting port part configured to be connected to the drilling tool while pressing a specified region of the drilling tool, and a storing part mounting port part configured to be connected to the storing part while pressing a specified region of the storing part. Air containing the dust is led through the dust collector body to the storing part, and the air from which the dust has been separated in the storing part is led through the passage part into the drilling tool.

13 Claims, 8 Drawing Sheets (56) References Cited

U.S. PATENT DOCUMENTS

| | | | | |
|---|---|---|---|---|
| 7,909,114 B2* | 3/2011 | Nishikawa | ......... | B23Q 11/0046 |
| | | | | 173/198 |
| 8,424,615 B2* | 4/2013 | Baumann | ................ | B25F 5/021 |
| | | | | 173/170 |
| 9,475,164 B2* | 10/2016 | Simm | ................... | A47L 9/1409 |

FOREIGN PATENT DOCUMENTS

| EP | EP 1872899 A1 * | 1/2008 | ......... B23Q 11/0046 |
|---|---|---|---|
| EP | EP 1872900 A2 * | 1/2008 | ......... B23Q 11/0046 |
| EP | EP 1923174 A1 * | 5/2008 | ............. B08B 15/04 |
| JP | 2006-102854 A | 4/2006 | |
| JP | 2010012573 A * | 1/2010 | |

* cited by examiner

POWER TOOL

CROSS-REFERENCE TO RELATED APPLICATION

The present application claims priority to Japanese patent application No. 2015-199448 filed on Oct. 7, 2015, the contents of which are incorporated herein by reference in its entirety.

TECHNICAL FIELD

The present invention relates to a power tool that includes a drilling tool and a dust collector that is configured to be removably attached to the drilling tool.

BACKGROUND

Japanese laid-open patent publication No. 2006-102854 discloses a drilling tool having a dust collecting fan. An intake assembly having a dust suction port and a dust bag for storing dust can be mounted to the drilling tool. With such a structure, dust generated by operation of the drilling tool can be sucked through the suction port by intake air generated by the dust collecting fan, and led to the dust bag by way of the dust collecting fan, and stored in the dust bag.

SUMMARY

In the above-described structure, the dust generated by the drilling operation can be prevented from scattering. On the other hand, as the dust is led to the dust bag by way of the dust collecting fan, the dust can easily enter the drilling tool. Therefore, further improvement is desired to prevent entry of dust into the drilling tool.

Accordingly, it is an object of the present invention to provide a further rational technique for preventing dust from entering a drilling tool.

The present disclosure herein provides a power tool according to the present invention includes a drilling tool configured to perform a drilling operation by driving a tool accessory, and a dust collector configured to be removably attached to the drilling tool. The drilling tool includes a driving mechanism configured to drive the tool accessory. The dust collector includes a dust collector body, a passage and a storing part. The passage part is provided in the dust collector body and has elasticity. The storing part is configured to be removably attached to the dust collector body and to store dust generated by the drilling operation. The passage includes a drilling tool mounting port part and a storing part mounting port part. The drilling tool mounting port part is configured to be connected to the drilling tool while pressing a specified region of the drilling tool. The storing part mounting port part is configured to be connected to the storing part while pressing a specified region of the storing part. With such a structure, the air containing the dust is led through the dust collector body to the storing part, and the air from which the dust has been separated in the storing part is led through the passage part into the drilling tool, while the dust is stored in the storing part.

According to the power tool, the air from which the dust has been separated in the storing part can be led into the drilling tool while the dust is stored in the storing part. Consequently, entry of the dust into the drilling tool can be prevented. In this case, the drilling tool mounting port part and the storing part mounting port part press the drilling tool and the storing part, respectively. Consequently, efficient flow of air can be realized.

As a typical structure of the power tool according to the present disclosure, the drilling tool mounting port part and the storing part mounting port part may be configured to protrude from the dust collector body. With such a structure, when the drilling tool is attached to the dust collector body, the drilling tool mounting port part presses the drilling tool, and when the storing part is attached to the dust collector body, the storing part mounting port part presses the storing part. "Pressing" by the drilling tool mounting port part or the storing part mounting port part can also be referred to as "biasing".

With the structure in which the dust collector body is connected to the drilling tool while the drilling tool mounting port part presses the specified region of the drilling tool, the drilling tool mounting port part can be brought into close contact with the specified region of the drilling tool. Thus, the air flowing from the dust collector body to the drilling tool can be prevented from leaking. In other words, the passage part has a mechanism for close contact with the drilling tool. This mechanism can also be referred to as an air leakage preventing mechanism.

Similarly, with the structure in which the dust collector body is connected to the storing part while the storing part mounting port part presses the specified region of the storing part, the storing part mounting port part can be brought into close contact with the specified region of the storing part. Thus, the air flowing from the storing part to the dust collector body can be prevented from leaking. In other words, the passage part has a mechanism for close contact with the storing part. This mechanism can also be referred to as an air leakage preventing mechanism.

Further, as a typical structure of the power tool according to the present disclosure, the drilling tool may include a dust collector mounting part, the dust collector may include a drilling tool mounting part and a storing part mounting part, and the storing part may include a dust collector body mounting part. In such a structure, the passage part may be provided to extend between the drilling tool mounting part and the storing part mounting part. An opening may be formed in the dust collector mounting part of the drilling tool as the specified region of the drilling tool to be connected to the drilling tool mounting port part. Further, an opening may be formed in the dust collector body mounting part of the storing part as the specified region of the storing part to be connected to the storing part mounting port part.

Further, as a structure for feeding the air containing the dust through the dust collector body to the storing part, and then feeding the air, from which the dust has been separated in the storing part, through the passage part into the drilling tool, the drilling tool may include a dust collecting fan. Preferably, the dust collecting fan may be rotationally driven by a driving source of the driving mechanism. In a case where the driving source is a motor, the dust collecting fan may be provided coaxially with a rotary shaft of the motor.

In the structure in which the drilling tool includes the dust collecting fan, the drilling tool may have a dust collecting fan intake opening and a dust collecting fan exhaust opening. The dust collecting fan intake opening is configured as an opening to be connected to the above-described drilling tool mounting port part of the passage part.

Further, the dust collector body may have a front intake opening through which the dust generated by the drilling operation of the tool accessory is taken in together with the air, and an intermediate airflow opening formed in the storing part mounting part to feed the air containing the dust and taken in through the front intake opening to the storing part. The storing part may have a storing part intake opening to be connected to the intermediate airflow opening, a dust storing chamber, a filter provided in the dust storing chamber and configured to separate the dust from the air, and a storing part exhaust opening through which the air separated from the dust by the filter is discharged toward the drilling tool. The storing part exhaust opening may be configured as an opening to be connected to the above-described storing part mounting port part of the passage part.

In the power tool having the above-described typical structure according to the present disclosure, the air that is taken in through the front intake opening with the dust along with rotation of the dust collecting fan can be led through the intermediate airflow opening and the storing part intake opening, and then to the filter. The dust can be separated from the air by the filter, and thereafter the air can be led through the passage part and discharged from a fan exhaust opening. The dust separated by the filter can be stored in the dust storing chamber.

In this structure, an air passage leading from the front intake opening to the filter and an air passage leading from the filter to the fan exhaust opening may be defined as a first air passage and a second air passage, respectively.

In the power tool according to the present disclosure, the drilling tool having various kinds of structures can be selected as a tool for performing a drilling operation on a workpiece. Typical examples of the drilling tool include a drill that is configured to rotationally drive the tool accessory, a hammer drill that is configured to rotationally drive the tool accessory while linearly driving it, and an oscillating drill that is configured to rotationally drive the tool accessory while oscillating it. The driving mechanism of the drilling tool may be configured as a mechanism for causing the tool accessory to perform a desired driving operation.

In another aspect of the power tool according to the present disclosure, the passage part may include a hollow passage body. Further, the drilling tool mounting port part, the storing part mounting port part and the passage body may be formed in one piece. In other words, the passage body, the drilling tool mounting port part and the storing part mounting port part may form a passage assembly.

In the power tool according to this aspect, the passage part can be easily mounted to the dust collector body.

In another aspect of the power tool according to the present disclosure, the passage part may include a flexible tubular member and a coil spring disposed in the flexible tubular member, In the power tool according to this aspect, the drilling tool mounting port part and the storing part mounting port part can be pressed against the drilling tool and the storing part, respectively, by the biasing force of the coil spring.

Further, the flexible tubular member may be formed by a film made of synthetic resin or rubber.

According to the present disclosure, a further rational technique for preventing dust from entering a drilling tool can be provided.

DETAILED DESCRIPTION OF THE EMBODIMENTS

Figure 1:
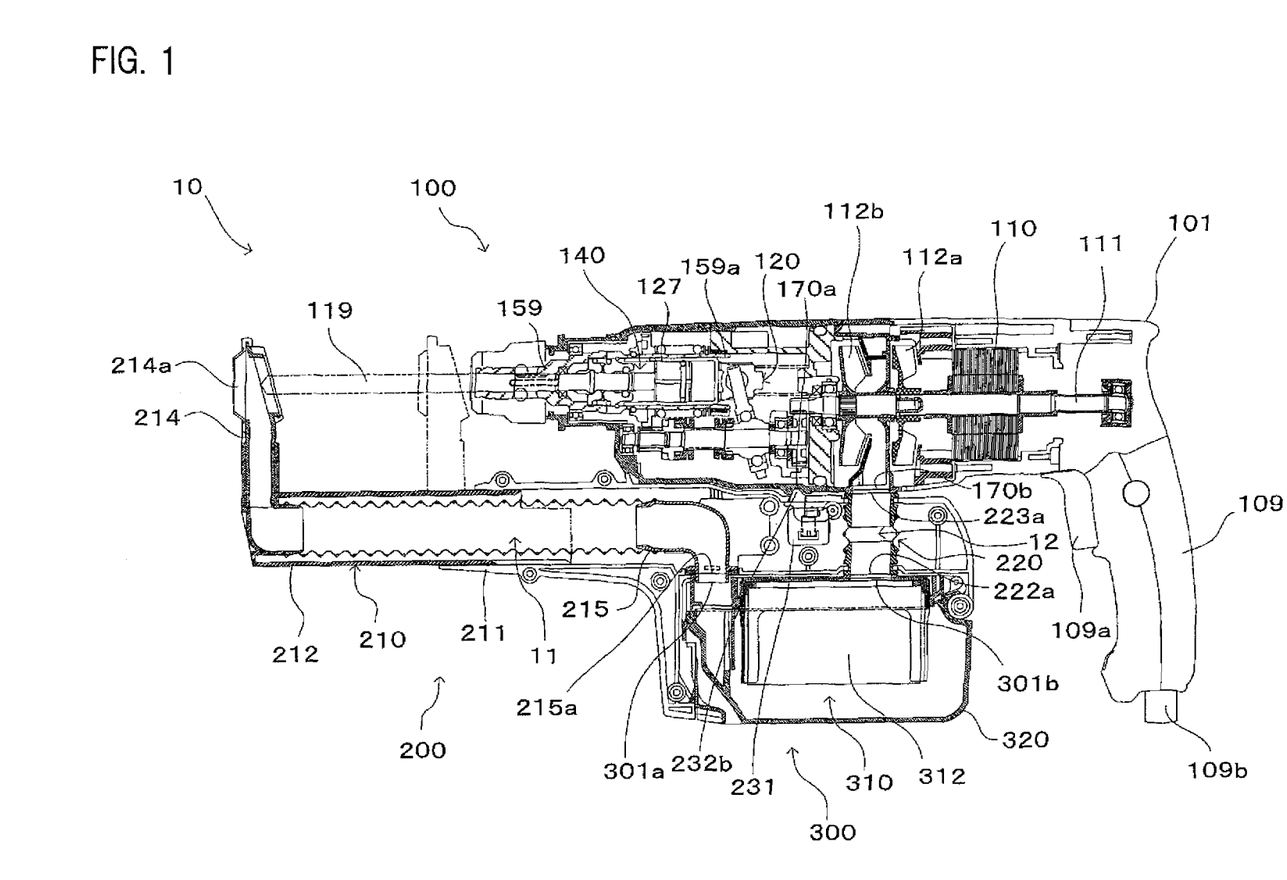
FIG. 1 is a sectional view showing a power tool according to an embodiment of the present invention.

An embodiment of a power tool 10 according to the present invention is now explained with reference to FIGS. 1 to 8. As shown in FIG. 1, the power tool 10 includes a drilling tool that is configured to perform an operation by driving a tool accessory, and a dust collector 200 that is configured to be removably attached to the drilling tool. In the embodiment, a hammer drill 100 that is configured to perform a drilling operation by driving a tool bit 119 is explained as an example of the drilling tool. The power tool 10, the tool bit 119, the hammer drill 100 and the dust collector 200 are examples that correspond to the "power tool", the "tool accessory", the "drilling tool" and the "dust collector", respectively, according to the present invention. The power tool 10 can also be referred to as a set of the dust collector 200 and the hammer drill 100, or the hammer drill 100 that is equipped with the dust collector 200.

For the sake of explanation, in relation to a specified axial direction (a left-right direction as viewed in FIG. 1), the left side and the right side are defined as the front side and the rear side of the power tool 10, respectively. Further, in a direction (a top-bottom direction as viewed in FIG. 1) perpendicular to the specified axial direction, the upper side and the lower side are defined as the upper side and the lower side of the power tool 10, respectively. These definitions for the front side, the rear side, the upper side and the lower side can be equally applied to the hammer drill 100 or the dust collector 200.

(Hammer Drill)

Figure 2:
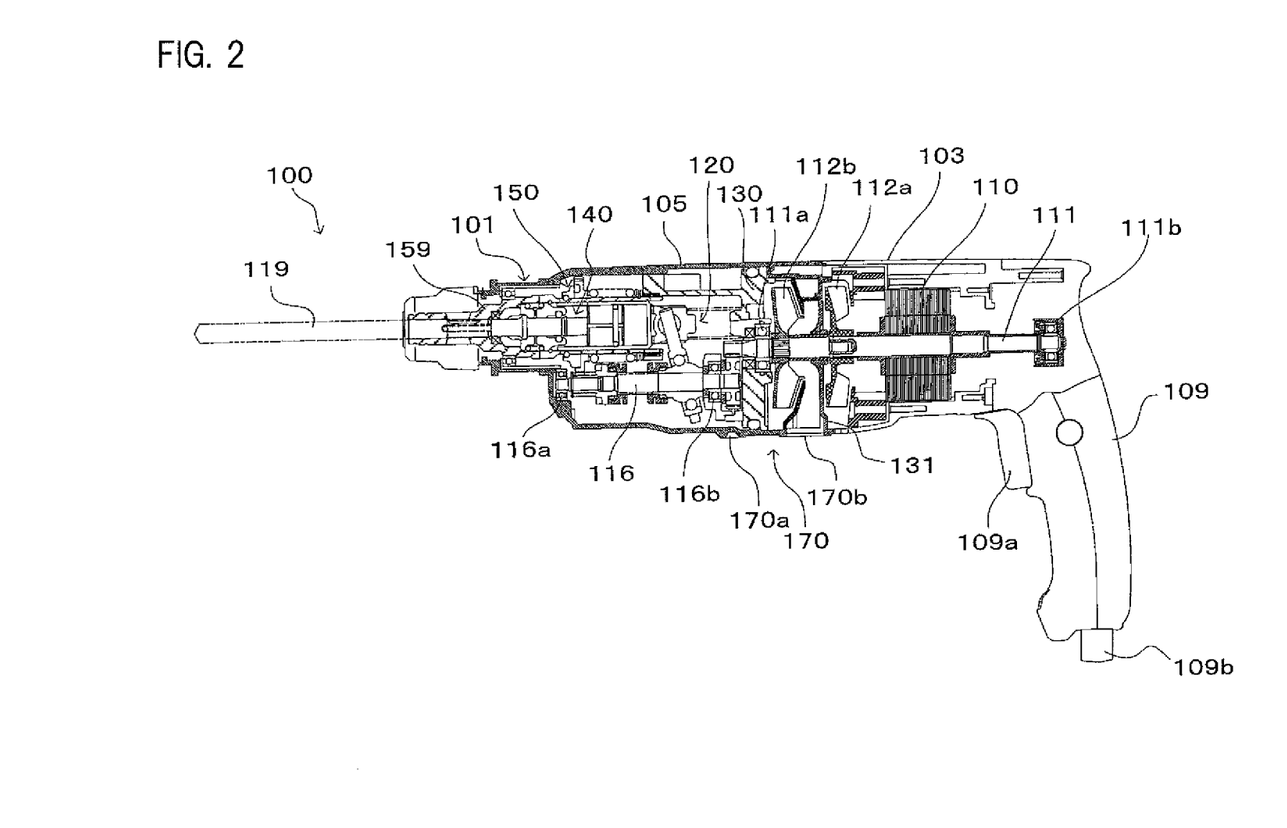
FIG. 2 is a sectional view showing a drilling tool.

FIG. 2 is a sectional view for illustrating the outline of the hammer drill 100. As shown in FIG. 2, the hammer drill 100 is a hand-held power tool having a handgrip 109 configured to be held by a user. The hammer drill 100 is configured to perform hammering motion by linearly driving the tool bit 119 in an axial direction of the tool bit 119 in order to perform a hammering operation on a workpiece, and to perform rotating motion by rotationally driving the tool bit 119 around an axis of the tool bit 119 in order to perform a drilling operation on a workpiece. In order to appropriately select a drive mode of the tool bit 119 in the hammer drill 100, the user can set the drive mode of the tool bit 119 by operating a mode change lever (not shown). The hammer drill 100 according to the present embodiment has a hammer drill mode in which the tool bit 119 is caused to perform the hammering motion as well as the rotating motion and a drilling mode in which the tool bit 119 is caused to perform only the rotating motion.

As shown in FIG. 2, a body housing 101 of the hammer drill 100 includes a gear housing 105, a motor housing 103, a fan housing 131 and an inner housing 130. An outer shell of the body housing 101 is formed by the gear housing 105, the motor housing 103 and the fan housing 131.

The body housing 101 includes the handgrip 109 designed to be held by the user. As shown in FIG. 2, the handgrip 109 includes a trigger 109a for energizing a driving motor 110 and a power cable 109b for supplying a current to the driving motor 110. When the user holds the handgrip 109 and operates the trigger 109a, a current is supplied to the driving motor 110 through the power cable 109b and the tool bit 119 is driven in a selected drive mode.

As shown in FIG. 2, the hammer drill 100 includes a dust collector mounting part 170. The dust collector mounting part 170 includes an engaged part 170a and a dust collecting fan intake opening 170b. The engaged part 170a is provided in the gear housing 105 for engaging with an engagement member 232 (see FIG. 4) of the dust collector 200. The dust collecting fan intake opening 170b is provided in the fan housing 131 for taking in air by rotational driving of a dust collecting fan 112b. Further, the fan housing 131 includes a dust collecting fan exhaust opening for discharging air sucked by the dust collecting fan 112b. An airflow regulating member 131a for regulating an air flow is provided on the fan housing 131.

As shown in FIG. 2, a tool holder 159 is configured to removably hold the tool bit 119 and arranged to be rotatable with respect to the body housing 101. An output shaft 111 of the driving motor 110 is rotatably supported by a bearing 111a fixed to the inner housing 130 and a bearing 111b fixed to the motor housing 103. An air cooling fan 112a, the dust collecting fan 112b and a pinion gear 113 are provided on the output shaft 111 to be rotatable with the output shaft 111. The driving motor 110 may be cooled by the air flow generated by rotation of the air cooling fan 112a.

(Tool Bit Driving Mechanism)

A structure of a tool bit driving mechanism that is configured to drive the tool bit 119 within the body housing 101 is now explained. The tool bit driving mechanism is an example that corresponds to the "driving mechanism" according to the present invention.

As shown in FIG. 2, the tool bit driving mechanism mainly includes a striking mechanism 120 that is configured to linearly drive the tool bit 119 and a rotation transmitting mechanism 150 that is configured to rotationally drive the tool bit 119.

Figure 3:
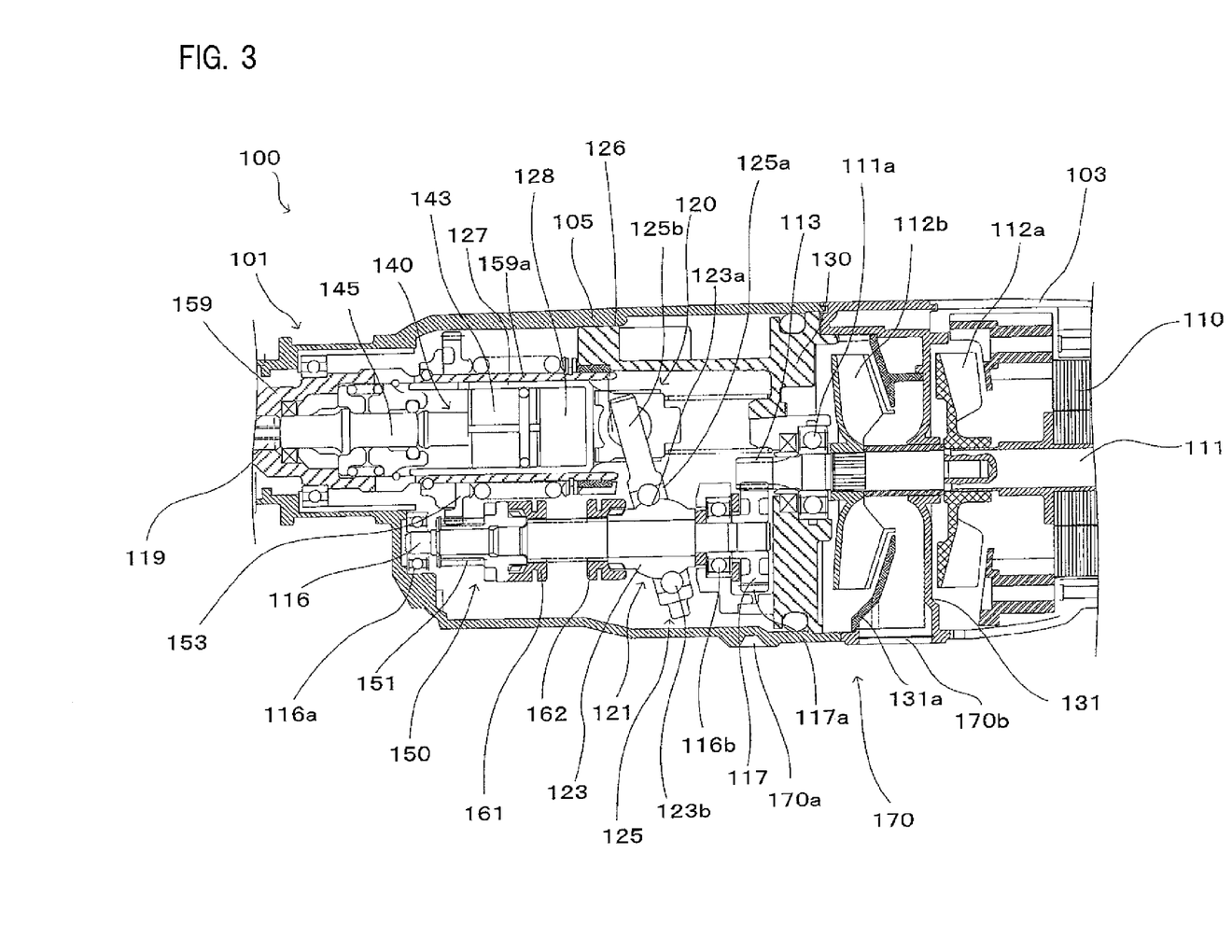
FIG. 3 is an explanatory drawing showing a major part of a driving mechanism.

The striking mechanism 120 and the rotation transmitting mechanism 150 may be driven along with rotation of an intermediate shaft 116. A front region of the intermediate shaft 116 is supported by a bearing 116a disposed on the gear housing 105, and a rear region of the intermediate shaft 116 is supported by a bearing 116b. As shown in FIG. 3, the intermediate shaft 116 may be rotated by a driven gear member 117. The driven gear member 117 has gear teeth 117a that are engaged with the pinion gear 113 of the driving motor 110.

(Rotation Transmitting Mechanism)

As shown in FIG. 3, the rotation transmitting mechanism 150 includes a second gear 153 that engages with a first gear 151 that is integrally formed with the intermediate shaft 116. The second gear 153 is integrally formed with a piston housing region 159a of the tool holder 159. With such a structure, rotation of the intermediate shaft 116 is transmitted to the first gear 151, the second gear 153 and the tool holder 159, so that the tool bit 119 can be rotationally driven.

(Striking Mechanism)

As shown in FIG. 3, the striking mechanism 120 includes a swinging mechanism 121 and a striking element 140. The swinging mechanism 121 mainly includes a rotary body 123 and a swinging shaft 125. The rotary body 123 is configured to be rotatable with respect to the intermediate shaft 116. The rotary body 123 has an outer circumferential surface 123a having a specified inclination angle with respect to the intermediate shaft 116. The swinging shaft 125 includes an annular part 125a and a shaft part 125b. The annular part 125a is mounted on the outer circumferential surface 123a of the rotary body 123 via a plurality of steel balls 123b. The shaft part 125b is provided to extend upward from the annular part 125a and is connected to a piston 127 via a joint pin 126. With such a structure, the annular part 125a may move following inclination of the outer circumferential surface 123a that changes as the rotary body 123 rotates. Accordingly, the shaft part 125b is caused to swing in a back-and-forth direction along a rotation axis of the intermediate shaft 116. The piston 127 is then caused to linearly reciprocate by a linear motion component of the swinging motion of the shaft part 125b.

As shown in FIG. 3, the striking element 140 mainly includes the piston 127, a striker 143 and an impact bolt 145. The piston 127 is configured as a bottomed cylindrical member and slidably disposed in a bore of the piston housing region 159a of the tool holder 159. The striker 143 is a striking element that is slidably disposed in a bore of the piston 127. The impact bolt 145 is an intermediate element that is slidably disposed in a bore of the tool holder 159. The impact bolt 145 is configured to transmit kinetic energy of the striker 143 to the tool bit 119. As shown in FIG. 3, an air chamber 128 is formed between a bottom of the piston 127 and the striker 143. The striker 143 may be linearly driven by pressure fluctuations that are caused within the air chamber 128 when the piston 127 is reciprocated.

As shown in FIG. 3, a first clutch 161 and a second clutch 162 are connected onto the intermediate shaft 116 by a spline. The first and second clutches 161, 162 may be moved in the front-rear direction in conjunction with a user's operation on the mode change lever. FIGS. 1, 2 and 3 show a state in which the hammer drill mode is selected with the mode change lever. Detailed description of the mode change lever is omitted here for convenience sake.

(Dust Collector)

A dust collector 200 is now explained with reference to FIGS. 4 to 7. The dust collector 200 includes a dust collector body 201 (see FIG. 4) and a storing part 300 (see FIG. 7) that is configured to be removably attached to the dust collector body 201. The dust collector body 201 and the storing part 300 are examples that correspond to the "dust collector body" and the "storing part", respectively, according to the present invention.

Figure 4:
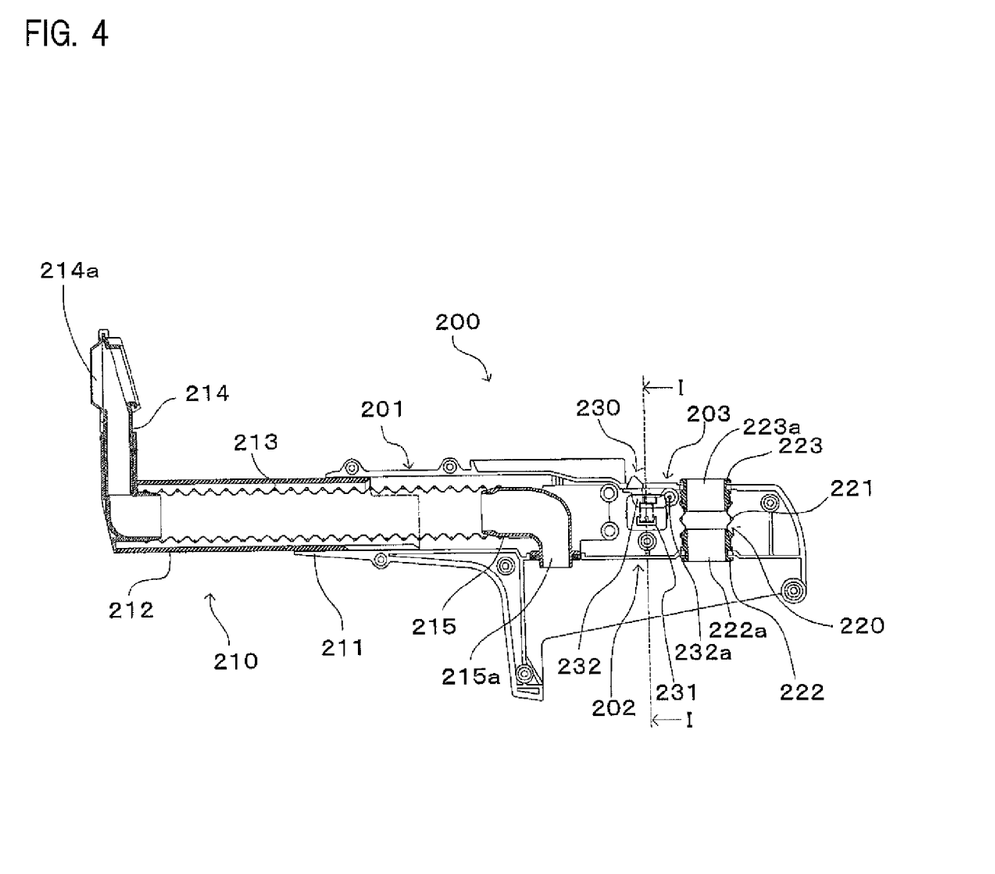
FIG. 4 is a sectional view showing a dust collector body.

As shown in FIG. 4, the dust collector body 201 includes a drilling tool mounting part 203 and a storing part mounting part 202. The drilling tool mounting part 203 and the storing part mounting part 202 have respective openings and a passage part 220 is disposed to extend between the openings. The passage part 220 is an example that corresponds to the "passage part" according to the present invention.

(Passage Part)

Figure 5:
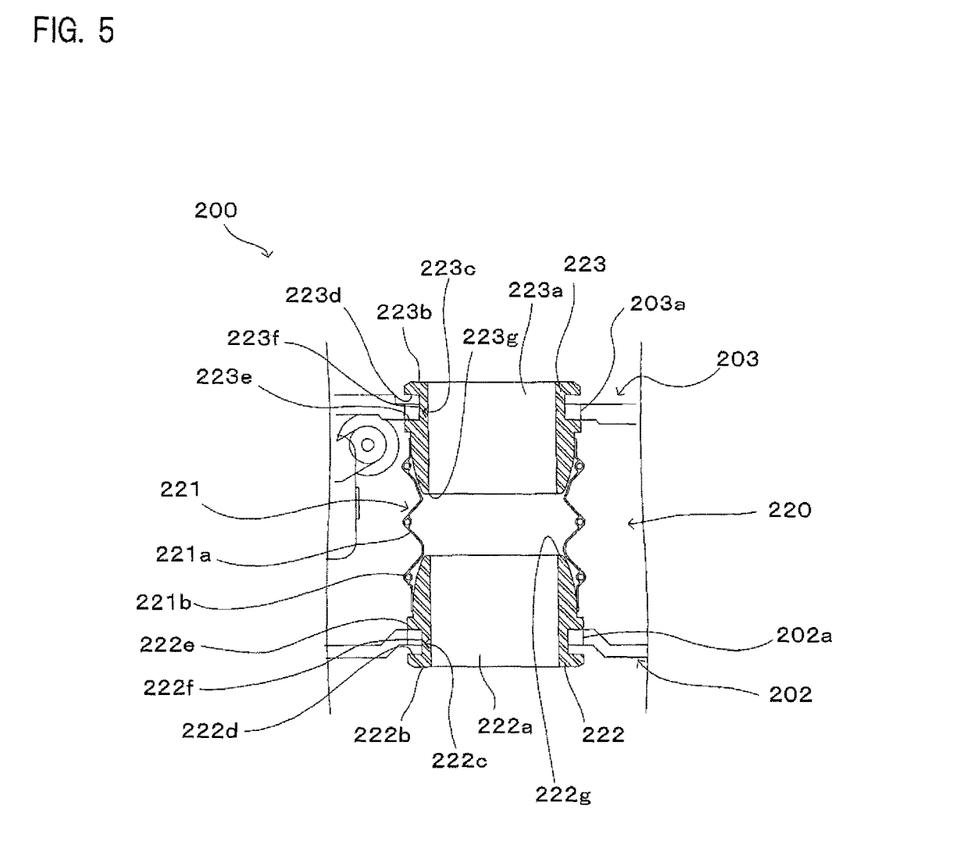
FIG. 5 is a sectional view showing a passage part.

As shown in FIG. 5, the passage part 220 includes a passage body 221, an intake port part 222 and an exhaust port part 223. The passage body 221, the intake port part 222 and the exhaust port part 223 are examples that correspond to the "passage body", the "storing part mounting port part" and the "drilling tool mounting port part", respectively, according to the present invention.

The passage body 221 includes a tubular member 221a and a coil spring 221b disposed in the tubular member 221a. The tubular member 221a and the coil spring 221b are examples that correspond to the "flexible tubular member" and the "coil spring", respectively, according to the present invention.

As shown in FIG. 5, the intake port part 222 is a tubular member that is fitted into the passage body 221. The intake port part 222 has an outside end part 222b that is exposed from the passage body 221 and an inside end part 222g that is disposed inside the passage body 221. The outside end part 222b and the inside end part 222g have respective openings, and the opening of the outside end part 222b forms a passage part intake opening 222a. As described below, the passage part intake opening 222a may be connected to a storing part exhaust opening 301b of the storing part 300 (see FIG. 8). The intake port part 222 is formed of an elastic material such as synthetic resin or rubber.

As shown in FIG. 5, a groove 222c is formed in a region adjacent to the outside end part 222h. The groove 222c has an outside wall part 222d, an inside wall part 222e and an extending part 222f extending between the outside wall part 222d and the inside wall part 222e.

As shown in FIG. 5, when the passage part 220 is mounted to the dust collector body 201, an opening edge part 202a of the storing part mounting part 202 is placed in the groove 222c. The intake port part 222 is biased toward the outside by the coil spring 221b, so that the inside wall part 222e of the groove 222c is brought into contact with the opening edge part 202a.

As shown in FIG. 5, the exhaust port part 223 is a tubular member that is fitted into the passage body 221. The exhaust port part 223 has an outside end part 223b that is exposed from the passage body 221 and an inside end part 223g that is disposed inside the passage body 221. The outside end part 223b and the inside end part 223g have respective openings, and the opening of the outside end part 223b forms a passage exhaust opening 223a. As described below, the passage exhaust opening 223a may be connected to a dust collecting fan intake opening 170b of the hammer drill 100 (see FIG. 8). Further, the exhaust port part 223 is formed of an elastic material such as synthetic resin or rubber.

As shown in FIG. 5, a groove 223c is formed in a region adjacent to the outside end part 223b. The groove 223c has an outside wall part 223d, an inside wall part 223e and an extending part 223f extending between the outside wall part 223d and the inside wall part 223e.

As shown in FIG. 5, when the passage part 220 is mounted to the dust collector body 201, an opening edge part 203a of the drilling tool mounting part 203 is placed in the groove 223c. The exhaust port part 223 is biased toward the outside by the coil spring 221b, so that the inside wall part 223e of the groove 223c is brought into contact with the opening edge part 203a.

The passage part 220 may be mounted to the dust collector body 201 after assembled into one piece with the intake port part 222 and the exhaust port part 223 fitted to the passage body 221. In other words, the passage body 221, the intake port part 222 and the exhaust port part 223 may form a passage part assembly. Such a structure facilitates mounting the passage part 220 to the dust collector body 201.

Further, the intake port part 222 and the exhaust port part 223 can be configured as identical parts, so that cost reduction can be realized.

(Front Intake Passage Part)

As shown in FIG. 4, the dust collector body 201 includes a front intake passage part 210. The front intake passage part 210 includes a tubular front intake passage body 211, a front tubular member 212, a front intake port part 214, a tubular intermediate airflow port part 215, and a tubular biasing member 213. The front intake passage body 211 is formed by extending the dust collector body 201. The front tubular member 212 is slidably disposed in the front intake passage body 211. The front intake port part 214 is mounted to a front end part of the front tubular member 212. The intermediate airflow port part 215 extends between the front intake passage body 211 and the storing part mounting part 202. The tubular biasing member 213 is provided to extend between the front intake port part 214 and the intermediate airflow port part 215. The front intake port part 214 has a front intake opening 214a through which the tool bit 119 may be inserted (see FIG. 1). The intermediate airflow port part 215 has an intermediate airflow opening 215a that is open to the storing part mounting part 202. The front tubular member 212 is configured such that the front tubular member 212 can protrude from and retract into the front intake passage body 211. The tubular biasing member 213 is formed by a flexible tubular member and a coil spring disposed in the flexible tubular member. The tubular biasing member 213 biases the front tubular member 212 forward.

With such a structure, as shown in FIG. 1, when the tool bit 119 advances into the workpiece as the drilling operation of the drilling tool 100 proceeds, the front tubular member 212 is retracted into the front intake passage body 211 while being held in contact with the workpiece. On the other hand, when the user pulls out the tool bit 119 from the workpiece, the front tubular member 212 moves forward and returns to its initial position by the biasing force of the tubular biasing member 213 that biases the front intake port part 214 forward.

The tubular biasing member 213 and the passage body 221 of the passage part 220 can be formed of the same material. Specifically, the tubular biasing member 213 and the passage body 221 can be obtained by differing the lengths of the respective materials from each other. Therefore, the cost for manufacturing the dust collector 200 can be reduced.

Figure 6:
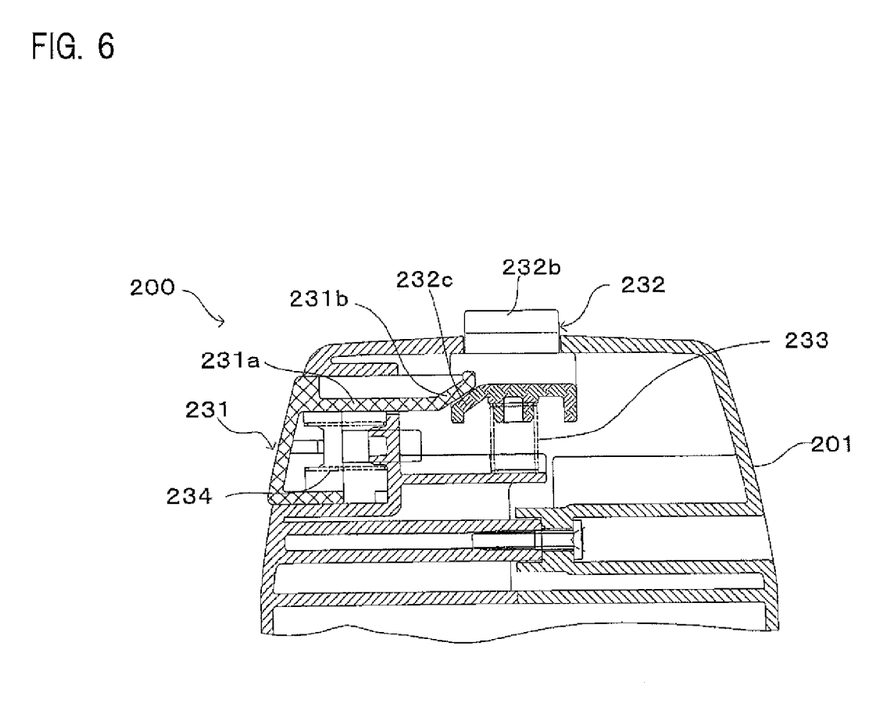
FIG. 6 is a sectional view taken along line I-I in FIG. 4.

As shown in FIGS. 4 and 6, an attaching/detaching mechanism 230 for attachment to and detachment from the drilling tool 100 is provided in the drilling tool mounting part 203 of the dust collector 200. FIG. 6 is a sectional view taken along line I-I in FIG. 4.

As shown in FIG. 4, the attaching/detaching mechanism 230 includes an engagement member 232 and an operation part 231. The engagement member 232 is configured to engage with the engaged part 170a that is recessed in the dust collector mounting part 170 of the drilling tool 100. The operation part 231 is configured to release engagement between the engaged part 170a and the engagement member 232. As shown in FIG. 4, the engagement member 232 includes a pivot shaft 232a and a protrusion 232b. The pivot shaft 232a is provided for rotatably connecting the engagement member 232 to the dust collector body 201. The protrusion 232b is configured to engage with the engaged part 170a.

As shown in FIG. 6, the engagement member 232 further includes an inclined part 232c that is formed in a region between the pivot shaft 232a and the protrusion 232b. The inclined part 232c is inclined downward. Further, the engagement member 232 is biased in an outside direction of the dust collector body 201 by a biasing member 233. As a result, the protrusion 232b protrudes from the dust collector body 201.

As shown in FIG. 6, the operation part 231 includes an extending part 231a and an inclined part 231b that is formed on an extending end of the extending part 231a. The operation part 231 is biased in an outside direction of the dust collector body 201 by a biasing member 234. The inclined part 231b is inclined upward. Further, the protrusion 232b and the operation part 231 are configured such that the direction in which the operation part 231 is biased crosses the direction in which the protrusion 232b is biased.

Although not shown, the drilling tool mounting part 203 and the dust collector mounting part 170 have a slide mechanism that is configured to connect the two parts so as to be slidable with respect to each other. The slide mechanism can be formed, for example, by a groove that is formed in the drilling tool mounting part 203 and a ridge that is formed on the dust collector mounting part 170 to engage with the groove. When the user connects the drilling tool 100 and the dust collector 200 via the slide mechanism and moves them to a specified position with respect to each other, the engaged part 170a of the chilling tool 100 and the protrusion 232b of the engagement member 232 are engaged with each other (see FIG. 1). Thus, the drilling tool 100 and the dust collector 200 are prevented from moving with respect to each other and thus connected to each other.

In order to separate the drilling tool 100 and the dust collector 200, the user may press the operation part 231. At this time, the inclined part 231b of the operation part 231 presses the inclined part 232c of the engagement member 232, so that the engagement member 232 is rotated and the protrusion 232b is retracted into the dust collector body 201. In this manner, the user can release engagement between the protrusion 232b and the engaged part 170a by pressing the operation part 231, and thus can separate the drilling tool 100 and the dust collector 200 by sliding them.

(Storing Part)

The structure of the storing part 300 is now explained with reference to FIG. 7. The storing part 300 is configured to be removably attached to the dust collector body 201. The structure of removably attaching the storing part 300 to the dust collector body 201 may be formed, for example, by a slide mechanism including a groove that is formed in the storing part 300 and a ridge that is formed on the dust collector body 201 to engage with the groove. Further description of the slide mechanism is omitted here for convenience sake.

Figure 7:
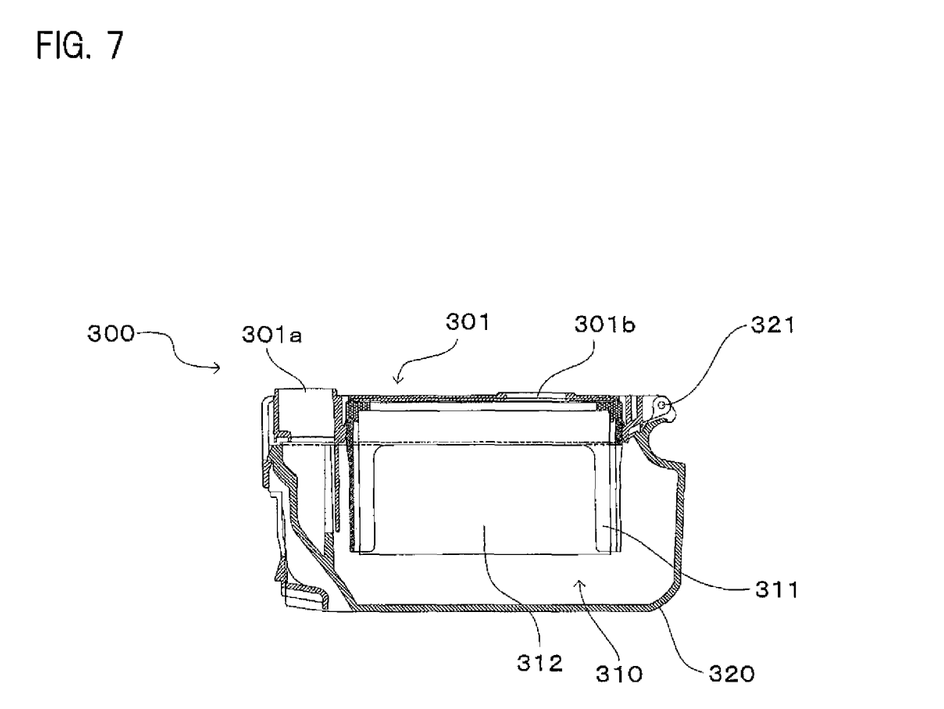
FIG. 7 is a sectional view showing a storing part.

As shown in FIG. 7, the storing part 300 includes a dust collector body mounting part 301, a dust storing chamber 310 and a cover 320. The dust collector body mounting part 301 includes a storing part intake opening 301a and a storing part exhaust opening 301b. The storing part intake opening 301a is connectable to the intermediate airflow opening 215a of the dust collector body 201. The storing part exhaust opening 301b is connectable to the passage intake opening 222a of the dust collector body 201. The dust storing chamber 310 includes a flame part 311 and a filter 312 that is configured to be removably attached to the flame part 311. The filter 312 is formed of an air permeable material such as paper and non-woven fabric. The filter 312 may be replaced by the user according to the level of attached dust on the filter. The dust may be separated from the air by the filter 312 and stored in the dust storing chamber 310. The cover 320 is configured to be opened and closed around a pivot shaft 321. The user can open the cover 320 to discard the dust stored in the dust storing chamber 310.

(Description of Operation)

Operation of the power tool 10 is explained with reference to FIGS. 1, 3 and 8. Before using the power tool 10, the user connects the drilling tool 100, the dust collector body 201 and the storing part 300 into one piece.

Figure 8:
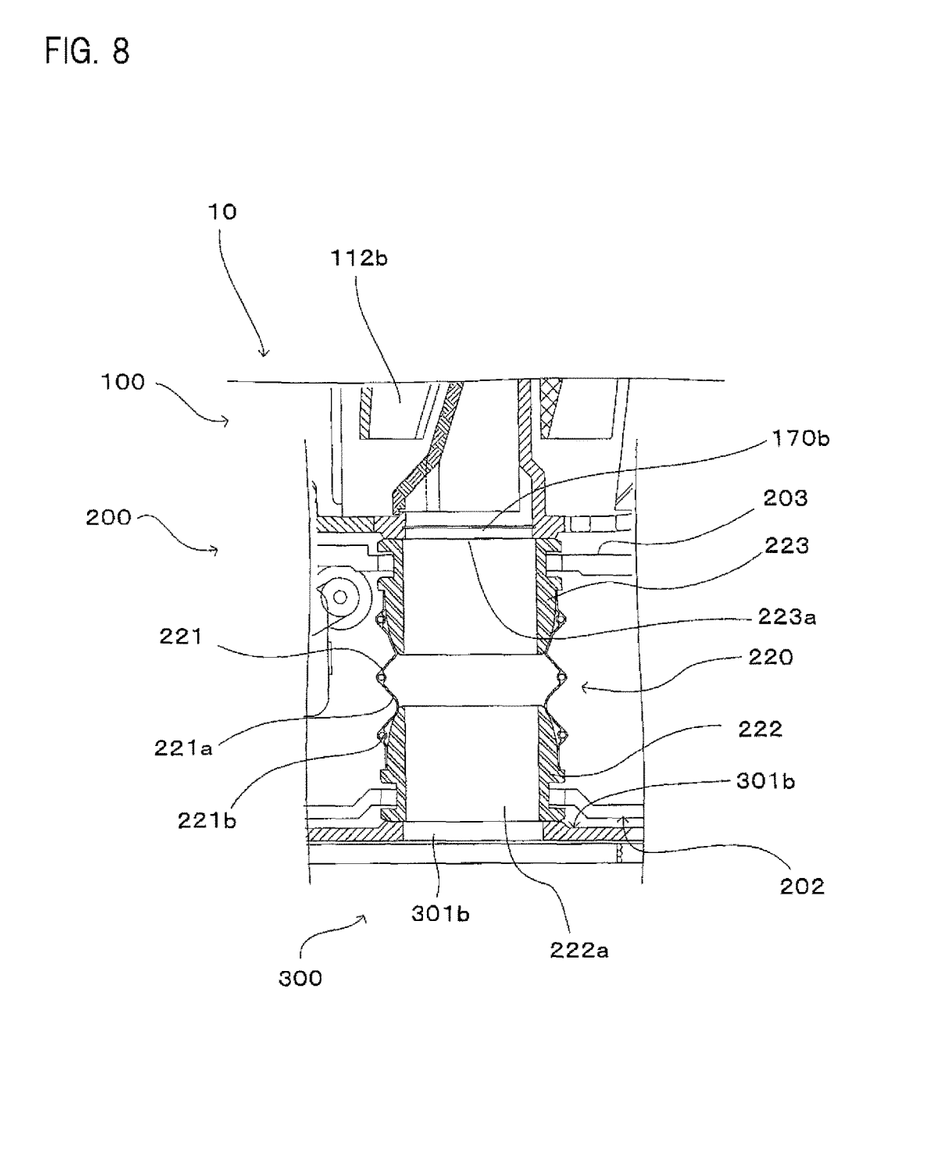
FIG. 8 is an explanatory drawing for showing an operation of the passage.

When the drilling tool mounting part 203 of the dust collector body 201 is mounted to the dust collector mounting part 170 of the drilling tool 100, as shown in FIG. 8, the dust collecting fan intake opening I 70b and the passage exhaust opening 223a are connected and form an air passage. At this time, the exhaust port part 223 presses the dust collector mounting part 170 due to the coil spring 221b of the passage body 221, so that leakage of the air from between the dust collecting fan intake opening 170b and the passage exhaust opening 223a can be suppressed. Further, the exhaust port part 223 is formed of an elastic material and is thus brought into close contact with the dust collector mounting part 170.

When the dust collector body mounting part 301 of the storing part 300 is mounted to the storing part mounting part 202 of the dust collector body 201, as shown in FIG. 1, the intermediate airflow opening 215a and the storing part intake opening 301a are connected and form an air passage. Further, as shown in FIG. 8, the passage intake opening 222a and the storing part exhaust opening 301b are connected and form an air passage. At this time, the intake port part 222 presses the dust collector body mounting part 301 due to the coil spring 221b of the passage body 221, so that leakage of the air from between the passage intake opening 222a and the storing part exhaust opening 301b can be suppressed. Further, the intake port part 222 is formed of an elastic material and is thus brought into close contact with the dust collector body mounting part 301.

As described above, the passage part 220 that is formed as a single part presses both the dust collector mounting part 170 and the dust collector body mounting part 301, and thus can form the air passage that can suppress leakage of the air.

By thus connecting the drilling tool 100, the dust collector body 201 and the storing part 300 into one piece, a first air passage 11 and a second air passage 12 that are shown in FIG. 1 are formed. The first air passage 11 is configured to feed air from the front intake opening 214a to the storing part intake opening 301a, and the second air passage 12 is configured to feed air from the storing part exhaust opening 301b to the dust collecting fan exhaust opening of the drilling tool 100. The filter 312 is disposed between the first and second air passages 11, 12.

When the user holds the handgrip 109 and operates the trigger 109a in a state in which the drilling tool 100, the dust collector body 201 and the storing part 300 are connected into one piece, the user can drive the tool bit 119 to perform a drilling operation.

When the drilling tool 100 is set to the hammer drill mode, the intermediate shaft 116 is rotationally driven by the output shaft 111 of the driving motor 110 that is shown in FIG. 3. By the rotational driving of the intermediate shaft 116, the striking mechanism 120 linearly drives the tool bit 119 via the striker 143 and the impact bolt 145 by pressure fluctuations that are caused within the air chamber 128 when the swinging shaft 125 reciprocates the piston 127. Further, by the rotational driving of the intermediate shaft 116, the rotation transmitting mechanism 150 rotates the tool holder 159 and thus rotationally drives the tool bit 119.

As shown in FIG. 1, when the output shaft 111 of the driving motor 110 is rotationally driven, the air cooling fan 112a and the dust collecting fan 112b are rotationally driven. An air flow generated by rotation of the air cooling fan 112a cools the driving motor 110.

By rotation of the dust collecting fan 112b, air is sucked through the front intake opening 214a of the dust collector 200, passes through the first air passage 11 and then through the filter 312. The air further passes through the second air passage 12, and is then discharged from the fan exhaust opening of the drilling tool 100. More specifically, air is sucked through the front intake opening 214a together with dust generated by the drilling operation, passes through the front intake passage part 210, the intermediate airflow opening 215 and the storing part intake opening 301a (the first air passage 11), and then the air with the dust is led into the dust storing chamber 310. Further, the dust contained in the air is collected by the filter 312, and the air that has passed through the filter 312 passes through the storing part exhaust opening 301b, the passage intake opening 222a, the passage body 221, the passage exhaust opening 223a and the dust collecting fan intake opening 170b, and then the air is discharged from the fan exhaust opening (the second air passage 12).

In the power tool 10 according to the embodiment of the present invention, the air is led into the drilling tool 100 after the dust is separated from the air by the filter 312. Therefore, the dust can be prevented from entering the drilling tool 100.

Further, the passage part 220 forms an air passage that can suppress leakage of the air by pressing the drilling tool 100 and the storing part 300. As a result, dust collecting operation can be efficiently performed.

In view of the nature of the above-described invention, the power tool according to this invention can be configured according to the following aspects. Each of the aspects can be employed separately or in combination with one or more of the other aspects, or in combination with the claimed invention.

(Aspect 1)

The drilling tool may include a dust collecting fan, a dust collecting fan intake opening configured to take in air along with rotational driving of the dust collecting fan, and a dust collecting fan exhaust opening configured to discharge the air taken in through the dust collecting fan intake opening.

(Aspect 2)

The drilling tool mounting port part may include a passage part exhaust opening, and the passage part may form an air passage that connects the passage exhaust opening and the dust collecting fan intake opening.

(Aspect 3)

The storing part mounting port part may include a passage intake opening, the storing part may include a storing part intake opening and a storing part exhaust opening, and the passage part may form an air passage that connects the passage intake opening and the storing part exhaust opening.

(Correspondences Between the Features of the Embodiments and the Features of the Invention)

Correspondences between the features of the embodiment and the features of the invention are as follows. The above-described embodiment is a mere example for embodying the present invention, and the present invention is not limited to the structures that are described in relation to the embodiment.

The power tool 10 is an example that corresponds to the "power tool" according to the present invention. The tool bit 119 is an example that corresponds to the "tool accessory" according to the present invention. The hammer drill 100 is an example that corresponds to the "drilling tool" according to the present invention. The dust collector 200 is an example that corresponds to the "dust collector" according to the present invention. The tool bit driving mechanism is an example that corresponds to the "driving mechanism" according to the present invention. The dust collector body 201 is an example that corresponds to the "dust collector body" according to the present invention. The storing part 300 is an example that corresponds to the "storing part" according to the present invention. The passage part 220 is an example that corresponds to the "passage part" according to the present invention. The passage body 221 is an example that corresponds to the "passage body" according to the present invention. The intake port part 222 is an example that corresponds to the "storing part mounting port" according to the present invention. The exhaust port part 223 is an example that corresponds to the "drilling tool mounting port" according to the present invention. The tubular member 221a is an example that corresponds to the "flexible tubular member" according to the present invention. The coil spring 221b is an example that corresponds to the "coil spring" according to the present invention.

DESCRIPTION OF THE NUMERALS

10 power tool
11 first air passage
12 second air passage
100 hammer drill (drilling tool)
101 body housing (body part)
103 motor housing
105 gear housing
109 handgrip
109a trigger
109b power cable
110 driving motor
111 output shaft
111a bearing
111b bearing
112a air cooling fan
112b dust collecting fan
113 pinion gear
116 intermediate shaft
116a bearing
116b bearing
117 driven gear member
117a gear teeth
119 tool bit (tool accessory)
120 striking mechanism
121 swinging mechanism
123 rotary body
123a outer circumferential surface
123b steel ball
125 swinging shaft
125a annular part
125b shaft part
126 joint pin
127 piston
128 air chamber
130 inner housing
131 fan housing
131a airflow regulating member
140 striking element
143 striker
145 impact bolt
150 rotation transmitting mechanism
151 first gear
153 second gear
159 tool holder
159a piston housing region
161 first clutch
162 second clutch
170 dust collector mounting part
170a engaged part
170b dust collecting fan intake opening
200 dust collector
201 dust collector body
202 storing part mounting part
202a opening edge part
203 drilling tool mounting part
203a opening edge part
210 front intake passage part
211 front intake passage body
212 front tubular member
213 tubular biasing member
214 front intake port part
214a front intake opening 215 intermediate airflow port part
215a intermediate airflow opening
220 passage part
221 passage body
221a tubular member (flexible tubular member)
221b coil spring
222 intake port part (storing part mounting port part)
222a passage intake opening
222b outside end part
222c groove
222d outside wall part
222e inside wall part
222f extending part
222g inside end part
223 exhaust port part (drilling tool mounting port part)
223a passage exhaust opening
223b outside end part
223c groove
223d outside wall part
223e inside wall part
223f extending part
223g inside end part
230 attaching/detaching mechanism
231 operation part
231a extending part
231b inclined part
232 engagement member
232a pivot shaft
232b protrusion
232c inclined part
233 biasing member
234 biasing member
300 storing part
301 dust collector body mounting part
301a storing part intake opening
301b storing part exhaust opening
310 dust storing chamber
311 flame part
312 filter
320 cover
321 pivot shaft

What is claimed is:

1. A power tool comprising a drilling tool configured to perform a drilling operation by driving a tool accessory, and a dust collector configured to be removably attached to the drilling tool, wherein:
the drilling tool includes a driving mechanism configured to drive the tool accessory,
the dust collector includes:
a dust collector body;
a passage part provided in the dust collector body and having elasticity; and
a storing part configured to be removably attached to the dust collector body and to store dust generated by the drilling operation,
the passage part includes:
a drilling tool mounting port part configured to be connected to the drilling tool while pressing a specified region of the drilling tool; and
a storing part mounting port part configured to be connected to the storing part while pressing a specified region of the storing part, and
air containing the dust is led through the dust collector body to the storing part, and the air from which the dust has been separated in the storing part is led through the passage part into the drilling tool, while the dust is stored in the storing part.

2. The power tool as defined in claim 1, wherein
the passage part includes a hollow passage body, and
the drilling tool mounting port part, the storing part mounting port part and the passage body are formed in one piece.

3. The power tool as defined in claim 1, wherein the passage part includes a flexible tubular member and a coil spring disposed in the flexible tubular member.

4. The power tool as defined in claim 1, wherein the drilling tool includes:
a dust collecting fan;
a dust collecting fan intake opening configured to take in air along with rotational driving of the dust collecting fan; and
a dust collecting fan exhaust opening configured to discharge the air taken in through the dust collecting fan intake opening.

5. The power tool as defined in claim 4, wherein
the drilling tool mounting port part includes a passage exhaust opening, and
the passage part forms an air passage connecting the passage exhaust opening and the dust collecting fan intake opening.

6. The power tool as defined in claim 5, wherein
the storing part mounting port part includes a passage intake opening,
the storing part includes a storing part intake opening and a storing part exhaust opening, and
the passage part forms an air passage connecting the passage intake opening and the storing part exhaust opening.

7. A dust collector configured to be removably attached to a drilling tool configured to perform a drilling operation by driving a tool accessory, the dust collector being configured to collect dust generated by the drilling operation using an air flow formed by the drilling tool, the dust collector comprising:
a body including a first passage through which the dust is fed with the air flow,
a storing part configured to be removably attached to the body and to collect and store the dust fed through the first passage,
a passage part formed as a tubular member, the tubular member forming a second passage and being disposed in the body, the second passage being configured such that the air flow from which the dust has been collected in the storing part is fed through, the passage part being configured to connect, when the dust collector is attached to the drilling tool, an inlet opening for the air flow provided in the drilling tool and an outlet opening for the air flow provided in the storing part,
wherein
the passage part includes a first end part and a second end part each having elasticity and partly protruding to an outside of the body,
the first end part is configured to be pressed against a surrounding area of the inlet opening of the drilling tool when the dust collector is attached to the drilling tool, and
the second end part is configured to be pressed against a surrounding area of the outlet opening of the storing part.

8. The dust collector as defined in claim 7, wherein the passage part includes a biasing part disposed between the first end part and the second end part, the biasing part biasing the first end part and the second end part, respectively, toward the outside of the body.

9. The dust collector as defined in claim 8, wherein the biasing part includes a flexible tubular member and a coil spring disposed in the flexible tubular member.

10. The dust collector as defined in claim 8, wherein
   the first end part, the second end part and the biasing part are formed as separate members, and
   the passage part is formed by connecting the first end part and the second end part respectively to both ends of the biasing part.

11. The dust collector as defined in claim 10, wherein the first end part and the second end part are formed as generally identical elastic tubular members, and respectively fitted to the both ends of the biasing member.

12. The dust collector as defined in claim 7,
   wherein the body includes:
      a first opening formed in a position facing the inlet opening of the drilling tool when the dust collector is attached to the drilling tool; and
      a second opening formed in a position facing the outlet opening of the storing part, and
   wherein the first end part and the second part of the passage part are inserted through the first opening and the second opening, respectively, such that the first end part and the second part are relatively movable in respective protruding directions with respect to the body.

13. The dust collector as defined in claim 12, wherein each of the first end part and the second part has a groove formed in an outer circumferential part and and extending in an circumferential direction thereof, and the first end part and the second part are inserted through the first opening and the second opening, respectively, in the respective grooves.

\* \* \* \* \*